Figure 1:
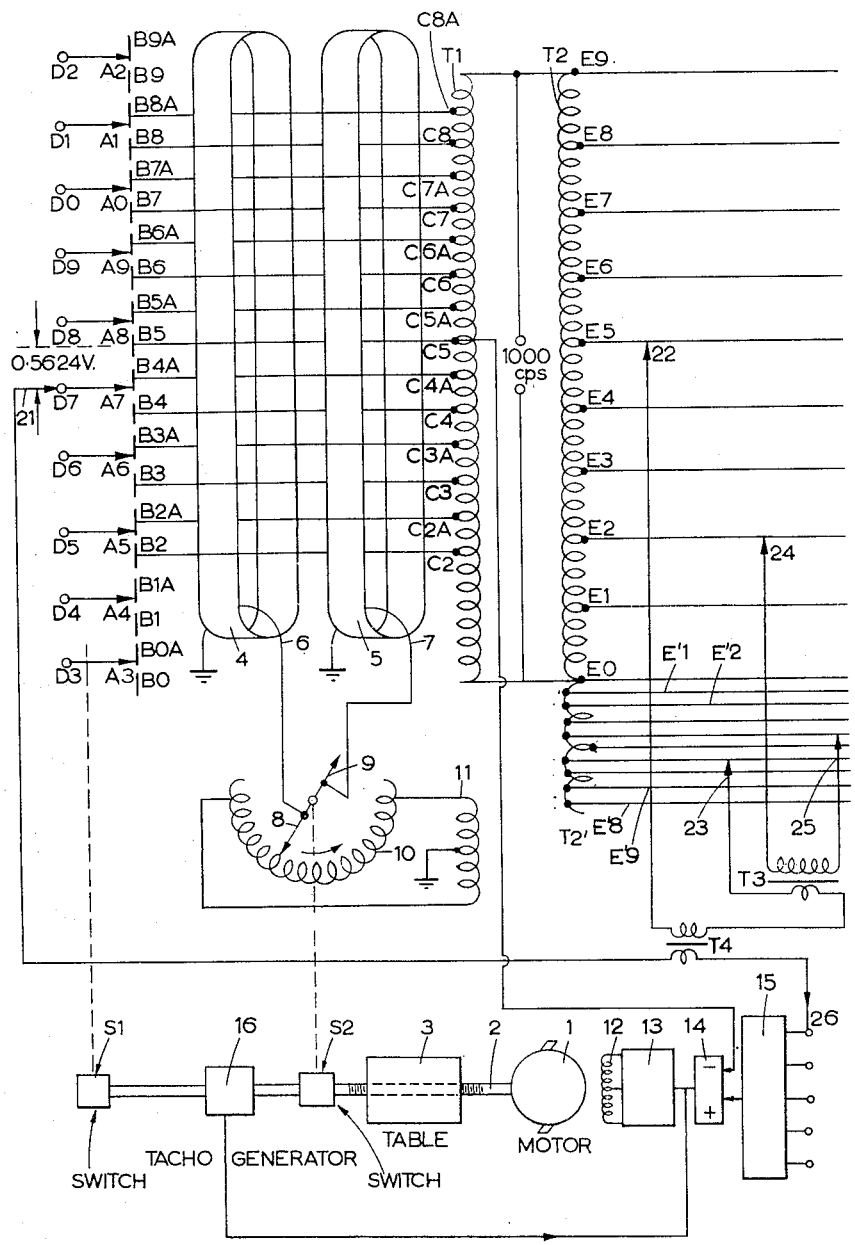

Aug. 1, 1961 R. E. SPENCER ET AL 2,994,812
SERVOMOTOR CONTROL SYSTEM ESPECIALLY FOR MACHINE TOOLS
Filed Aug. 7, 1958 2 Sheets-Sheet 1

Inventors
R. E. Spencer
J. H. Phillips
By Glancal Downing Seebold
Attys

United States Patent Office 2,994,812
Patented Aug. 1, 1961

2,994,812
SERVOMOTOR CONTROL SYSTEM ESPECIALLY FOR MACHINE TOOLS
Rolf Edmund Spencer, West Ealing, London, and James Hugh Phillips, Cookham, England, assignors to Electric & Musical Industries Limited, Hayes, Middlesex, England, a company of Great Britain
Filed Aug. 7, 1958, Ser. No. 753,793
Claims priority, application Great Britain Aug. 9, 1957
5 Claims. (Cl. 318—28)

The invention relates to automatic control systems, especially for machine tools.

In a proposed form of automatic control system for machine tools, signals are derived from a tape or other record and represent values of one co-ordinate at discrete reference points on a desired locus for the tool of the machine. From these derived signals a continuously variable electric command signal is produced by interpolation and the command signal forms one input to servo means which are arranged to displace the tool or work-carrier in the respective co-ordinate direction. A position analogue unit is moreover arranged to set up an electrical signal representing the displacement imparted by the servo means and this signal applied as feedback to the servo-means forms a second input thereto, the servo-means operating in known manner to tend to maintain equality between the command and feedback signals. It is often convenient to use a binary-decimal code for recording the signals, and it is then desirable to convert them into electrical analogue signals for storage and interpolation purposes. In one form of apparatus for achieving such conversion individual voltages are set up representing successive decimal digits of the recorded signals and these voltages are added by a series of step-down transformers to produce the desired analogue. Furthermore, the unit for setting up the position analogue signal may also employ a series of transformers whose outputs represent the contribution of digits of different denominational orders and which are suitably combined to produce the desired analogue.

An automatic control system of the kind described in the preceding paragraph is usually required to work with a high degree of accuracy and accuracies exceeding one part in 10,000 may be required. One method of obtaining a high accuracy is to arrange that the digital voltages which are summed to produce the analogue voltages are as large as possible. In other words, the voltage range covered by the highest denominational order used in building up the analogue voltage has to be large so as to allow many subdivisions of this voltage range corresponding to digits of lower orders. However, there is a practical limit for the voltage range for the highest denominational order. A further increase in accuracy can be achieved by omitting the highest order digit or digits of the command and feedback signals provided that these digits change by only one unit during any period when the same reference points are in use. However, this expedient gives rise to a difficulty because, in the command or feedback signals, there is a jump in the value of the highest order retained digit from one extreme to the other each time an omitted digit changes value. Moreover, because of the existence of an error, a jump in the feedback signal may occur at a different time from a jump in the command signal, so that there may be intolerable discontinuity in the error signal. Assume, for example, that the retained digit of highest order in the command signal is eight and the corresponding digit of the position analogue signal is two. The difference sensed by the servo amplifier would then be plus six and unless precautions are taken, the servo motor would operate to displace the controlled component by six units in the positive direction, whereas in fact the required displacement may be four units in the negative direction. It may be feasible to operate on the assumption that the error is always less than half the maximum value of the highest order retained digit in the command signal, and to make the operation conditional on a magnitude of the error but such operation would also lead to substantial difficulties of a practical character where continuous control is essential.

The object of the present invention is to reduce the difficulties indicated in the preceding paragraph.

According to the present invention there is provided an automatic control system wherein a variable is controlled in response to an error signal derived by comparing a command signal and a feedback signal which is responsive to the value of the variable, the system comprising a potential divider tapped at a series of reference points, a selector switch having an output terminal and which is operable to switch the output terminal from one reference point to the next in one sense to represent a predetermined variation of command signal and which is operable to switch the output terminal from one reference point to the next in the opposite sense in response to a corresponding variation of the variable, whereby the signal set up at said output terminal represents at least a major portion of said error signal.

It will be understood that as the signal at the output terminal of selector switch is the major part of the error signal, the major parts of the command and feedback signals are set up only implicitly at least in electrical form. The full electrical signal range available in the control system may therefore be allocated to twice the maximum error which is likely to arise in normal continuous operation of the control system, the factor of two being necessary to accommodate errors of both signs. When indicating a new operation, an error greater than this may sometimes need to be contended with, but a separate coarse control system may be provided for this contingency.

Figure 2:
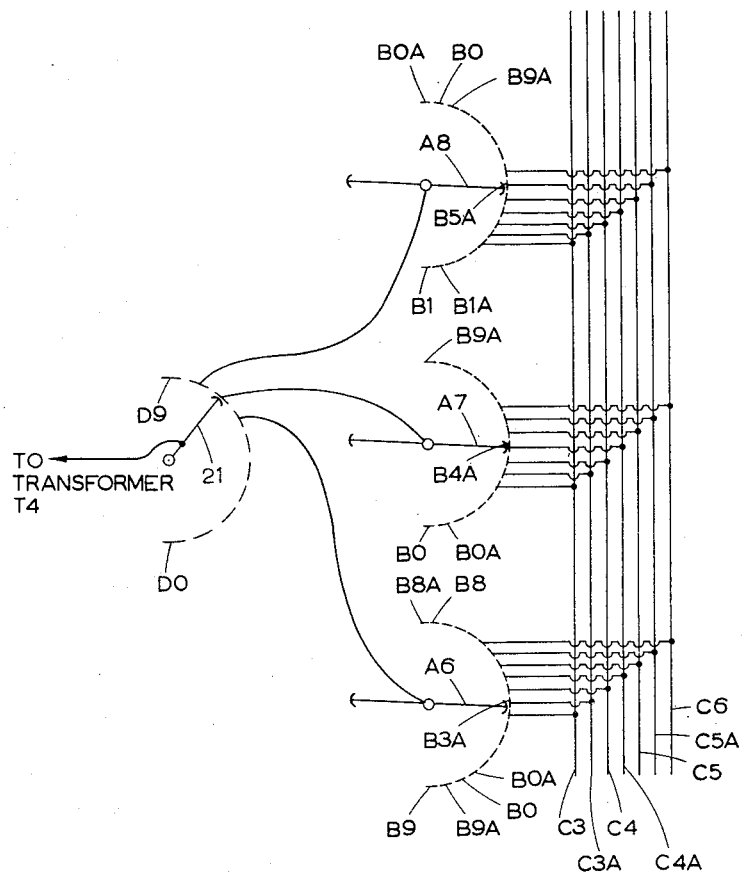

In order that the invention may be clearly understood and readily carried into effect, the invention will be described with reference to the accompanying drawing, in which:

FIGURE 1 illustrates one example of a position control system according to the present invention, and FIGURE 2 is a detail view of part of FIGURE 1.

Referring to FIGURE 1, the reference 1 represents a servomotor which drives a lead screw 2, the nut of which is attached to a table 3, which in the present example is the work-table of the machine tool. The lead screw 2 also drives two switches S1 and S2 which form part of a position analogue unit. The switches S1 and S2 are shown in two separated parts in the drawing to facilitate illustration, and the switch S1 comprises ten wipers A0 to A9 which are mechanically coupled so as to rotate as a unit when the lead screw 2 is rotated. The wipers are shown in a straight line in the drawing, but in fact are rotary wipers as will appear from the description of FIGURE 2. The wipers are furthermore arranged, when the lead screw 2 rotates, to traverse a circle of contacts B. There are ten pairs of these contacts, the first pair being denoted by the references B0 and B0A, the second pair being denoted by B1 and B1A, and so on. Moreover the contact pairs B2 to B8 are connected by conductors C2 to C8 to appropriately spaced tapping points on an auto-transformer T1 wound on a toroidal core, the conductors being laced selectively through injector toroid 1 cores 4 and 5 between the contacts and the transformer T1. The injector toroids have primary windings 6 and 7 which are earthed at one end and are connected at their opposite ends respectively to two wipers 8 and 9 which form part of the second switch S2, those wipers being driven by the lead screw 2. Suitable gearing is provided between the lead screw and the wipers of the switch S1 and also the wipers of the switch S2 so that the latter wipers rotate at ten times the rate of the former. The wipers 8 and 9 of the switch S2 traverse tapping points on an auto-transformer 10 which is supplied with reference voltage from a transformer secondary winding 11 on the same core as the transformer T1. All the wipers A of the switch S1 are of the make-before-break type and when rotation of the lead screw causes the wipers A to traverse the contact B, the electromotive forces injected into the conductor C by the injecting toroids 4 and 5 are such as to cause an almost smooth variation of the potential at the contacts A, as described for example in co-pending United States application Serial Number 484,202.

The motor 1 has a field winding 12, the current in which is controlled by a power amplifier 13 which receives the output signal of a differencing unit 14. One input to the differencing unit is derived as shown from the mid-point of the transformer T1 which may be earthed whilst the second input to the differencing unit is derived from an interpolating arrangement 15 which is shown merely in block form since it is of the construction described in co-pending United States application Serial Number 581,038, now Patent No. 2,929,555, March 22, 1960. A tacho-generator 16 may be provided driven from the lead screw 2 as indicated, for injecting velocity feedback to the servo-motor in known manner.

As explained in co-pending United States Patent No. 2,929,555 the interpolating arrangement 15 requires, as input signals, voltage analogue signals which represent values of one co-ordinate of successive reference points on the locus to be described by the worktable 3, the co-ordinate being that which is varied under the control of the motor 1. The interpolating arrangement 15 has five input terminals from which the analogue signals are derived for interpolation in a cyclic order, the signals applied to three of the terminals being used at any one time in the interpolation to determine the span within which the interpolation is carried out. Whilst the signals on three of the input terminals are in use in this way, those applied to the other two input terminals can be changed in such a manner that the output from the interpolating arrangement is in the form of a virtually continuous analogue command signal. Each input signal to the interpolating arrangement 15 may be set up in response to a record, such as a punched tape, punched card or the like, the use of such a record implies that the signals are recorded in a digital form, so that conversion to an electrical analogue signal is required before application of the signals to the interpolating arrangement. The drawing shows part of the means for setting up the analogue signal associated with one input terminal of the interpolating arrangement, and it is to be understood that the other analogue signals are set up by similar means. An accuracy to one part in 100,000 is required from the control system, and the converter comprises five selectors 21 to 25, one corresponding to each of the five decimal orders required to achieve this degree of accuracy. These selectors could in some cases be set by hand but may be moved to positions corresponding to the appropriate decimal digits in response to the record by means of uni-selectors or relays. The setting of selectors in response to a record is no part of the present invention and will not be further described. One suitable arrangement is however described in United States application Serial Number 620,145. The drawing shows the selectors in positions corresponding to the dimension 75.624 inches and the voltage scale is such that 10 volts represent 100 inches. The most significant digit is set up by the selector 21 which in the example described makes contact with the eighth stud of a series of studs D0 to D9. These studs are electrically connected to the respective wipers A0 to A9 as indicated and although FIGURE 1 may suggest that the studs move with the wipers in fact the switch SW is such that the studs remain stationary despite rotation of the wipers as will appear in the description of FIGURE 2, so that rotation of the wipers does not alter the stud selected by the selector 21. The selectors 22 and 24 are arranged to connect to selected bus bars E0 to E9 leading from a transformer T2 which is connected across the same voltage source as the transformer T1. The selectors 22 and 24 are set to represent the second and fourth order decimal digits of a desired analogue value. Similarly, the selectors 23 and 25 are set to represent the third and fifth decimal digits by selection among bus bars E0 and E'1 to E'9 leading from a transformer T2', which is a secondary winding to the transformer T2, being wound on the same core. The number of turns on T2' is predetermined so that the electro-motive force between adjacent bus bars is one tenth of that between adjacent bus bars connected to T2. The transformers T3 and T4 are arranged to add (in suitable ratio) to any voltage derived from the selector 21 the voltages between the selectors 22 and 23 on the one hand and between selectors 24 and 25 on the other hand. The transformer T3 has a step-down ratio of 100:1 and the transformer T4 has a step-down ratio of 10:1. With the selectors in the positions shown the voltage across the primary winding of the transformer T3 is 2.4 volts and this voltage, stepped down to .024 volt, is added across the primary winding of T4 to the voltage between the selectors 22 and 23. The latter voltage is 5.6 volts so that the voltage across the primary winding of T4 is 5.624 volts. This is now stepped down to 0.5624 volts by the transformer T4 and added to any voltage between the selector 21 and the mid-point of the transformer T1.

In order to explain the operation of the arrangement described no account will be taken of the operation of the interpolating arrangement 15 and it will be assumed that the output is equal to the voltage applied to the input terminal 26, namely the voltage selected by the wiper 21, increased by the increment, namely 0.5624 volt, injected by the transformer T4. The output of the interpolator will of course have this value at some point while it is interpolating within the span including that reference point, one coordinate of which is defined by the input signal to the terminal 26. If the table 3 is not in the position corresponding to the command signal set up by the interpolator the output from the differencing unit, suitably amplified, drives the servo-motor 1 and the switches S1 and S2 through gearing. As a result all the wipers on the switch S1 are rotated until the wiper A7 is moved to a position which is 0.5624 volt below the centre of contact B5, which is connected to the mid-point of the transformer T1 and thence directly to the upper input terminal of the differencing unit 14. In the absence of the injecting toroids 4 and 5, the contact B4A would be half a volt below the contact B5 but the switch S2 operates to vary the voltage on the contact B4A to produce equality of the input voltages applied to the differencing unit 14. Similarly if all the selectors 22 to 25 have been set on the zero bus bar, wiper A7 and with it the selector 21 would set itself exactly in the centre of the contact B5. The presence of the switch S2 and the connections associated with the toroids 4 and 5 results as indicated in an almost smooth variation in the potential at the contacts D as the table 3 is displaced by the servo-motor 1 and this makes it possible for the wiper selected by 21 to be set with a high degree of precision in a position corresponding to the command signal. The wipers may moreover stop in the commanded position unless in the meantime the command signal from the interpolator has changed.

FIGURE 2 illustrates in greater detail a part of the switch S1 in a practical form. The wipers A0 to A9 are each associated with an individual bank of contacts. Only three of the wipers are shown in FIGURE 2, but as indicated all the wipers are mounted in equivalent positions in the output shaft of the switch S1, and the effect of spacing them angularly about the shaft is achieved by altering in a cyclic way the order of connection of the respective banks of studs to the taps C. The wipers A0 to A9 are in turn connected electrically to the contacts of a further rotary switch comprising the contacts D0 to D9 and the selector 21. There is a separate rotary switch with contacts D0 to D9 and with its own selector for each analogue voltage required at any one time. The contacts D of all such rotary switches are connected in parallel to the wipers A. For the purpose of analysis it is convenient to regard the contacts B, the wipers A, and the contacts D and the selector 21 as a composite selector switch having an output terminal namely the selector 21. This composite switch is operable to switch the input terminal from one reference point on the auto-transformer T1 (which functions as a potential divider) to the next in one sense to represent a variation in the command signal equivalent to 10 inches in one direction. The reference points are of course the tappings on the auto-transformer in which the conductors C are connected. Furthermore, the composite switch is operable in response to the servo motor to switch the output terminal 21 from one reference point to the next on T1, but in the opposite sense to represent a corresponding variation of the variable, namely the displacement of the worktable. The analogue signal applied to the terminal 26, and similarly all the other analogue signals, do not therefore represent the displacement required of the table 3 (in the particular co-ordinate direction under consideration) with reference to any fixed datum point, but always with respect to the instantaneous displacement of the table. This of course does not affect any interpolation produced by 15, since it is equivalent merely in a shift of the respective co-ordinate of the origin of the system of axes in use.

In the example described, the selector 21, the series of studs D and the wipers A may be said to constitute differential switching means for connecting an output lead to the terminal 26 and thence to the servo motor 1. On this interpretation, the differential switching means comprises command means in the form of the selector 21 for switching the output lead from one of the contacts B to another, to represent desired displacement of the worktable 3, the contacts B being as described connected to reference points on the voltage divider constituted by the auto-transformer T1. The differential switching means also comprises feedback means which, by the action of the wipers A, switches the output lead from one contact B to another in response to displacement of the worktable 3. The servo motor 1 is responsive to the signal on the terminal 26, together with other similarly derived signals fed to the interpolator 15, to displace the worktable 3 and the mechanical connection between the worktable 3 and the wipers A is such that the displacement of the wipers, in response to the displacement of the table 3 tends to counteract the switching of the lead produced by the selector 21. Therefore while the selector 21 is displaced to represent the absolute displacement desired from the worktable 3, the actual signal which appears on the lead connected to the terminal 26 corresponds merely to the error between the actual displacement of the worktable 3 and the desired displacement.

In the example being described a limit of 30 inches is placed on the maximum span within which the interpolator 15 may operate. For this reason connections to the contacts B having the suffices 0, 0a, 1, 1A, 9 and 9A have been omitted. In fact the contact B0 must be disconnected from the transformer T1 to prevent the possibility of a short circuit across the transformer T1. At the end of a cycle, for example at position 99.999 inches, the wiper A9 is at —0.9999 volt with respect to contact B5 and wiper A0 is connected to contact B5. Therefore there is no cumulative error in the control system illustrated. The switch S1 can be rotated as many times as may be desired provided only the table 3 can move far enough, each rotation representing a travel of 100 inches.

There is thus no limit to the amount of travel which can be provided. Furthermore a much higher degree of accuracy can be obtained than would be possible if the command signal were required to represent the maximum possible travel within the same voltage range as that used in the example illustrated. The contacts B have to be arranged in pairs as indicated since it is necessary to keep the wipers A two contacts apart. The voltages on contacts B5 and 5A for example have to be changed by the injected potentials from the switch S2 so that they are equal when any of the wipers bridge them and the same remark applies to the other contacts. If the wipers were able to connect to adjacent contacts one wiper could then bridge to contacts whilst another was bridging one of these contacts with another contact thus short circuiting part of the transformer T1.

In the drawing a relatively simple arrangement is shown for setting up the voltage on the contacts B and in practice a more complex arrangement may be required to obtain an accuracy comparable with that indicated for the command signal.

Other injecting arrangements may be adopted for producing a smooth variation of the voltage picked up by the wipers A as the shaft 2 rotates. For example the auto-transformer 10 may be replaced by a variable linkage transformer in which the voltage applied to the windings 6 and 7 are caused to vary in a stepless manner by rotation of secondary windings relative to a primary winding. Such an arrangement is described for example in co-pending United States application Serial Number 484,202. The gear ratio between the switches S1 and S2 requires to be adjusted in this case, as the secondary windings rotate at half the speed of the wipers 8 and 9. It is moreover not necessary that the wipers A move continuously and the switch S may include an impulse motor for moving the wipers A in a series of discrete steps from one contact B to the next, in timed relationship with the movements of the wipers 8 and 9, or the transformer secondary windings if a variable linkage transformer is used.

What we claim is:

1. An automatic control system comprising a part whose displacement is to be controlled, a servo motor for producing displacement of said part, a voltage divider tapped at a series of reference points, a series of contacts connected respectively to said reference points, differential switching means having command input means adjustable to one of a series of positions corresponding to said contacts to represent a desired command, feedback input means adjustable to one of a series of positions corresponding to said contacts in response to the actual displacement of said part, and output means responsive to said command input means and said feedback output means for deriving a voltage from one of said contacts whose position relative to a predetermined intermediate contact corresponds to the difference between the positions of said command input means and said feedback input means, and means for applying said derived voltage as the error signal to said servo motor, said servo motor being responsive to said error signal to displace said part in the sense tending to reduce said signal and thereby produce a displacement of said part corresponding to said command.

2. A system according to claim 1, said differential switching means comprising a plurality of selectors spaced to make contact simultaneously with a corresponding plurality of said contacts, a mechanical coupling constituting said feedback input means for switching said selectors concomitantly from one contact to another in response to movement of said part, a series of fixed contacts each electrically connected to a particular one of said selectors, and a further selector constituting said command input means movable to connect said output lead to a selected one of said fixed contacts.

3. A system according to claim 2 comprising a plurality of banks of contacts, one bank to each of said plurality of selectors, said banks of contacts being connected in cyclic order to said reference points so that there are a plurality of contacts connected to each of said reference points, one such contact being individual to each selector.

4. A system according to claim 1, comprising means for injecting incremental voltages into the connections from said reference points to said contacts to produce output voltages at said contacts which vary relatively smoothly from the voltage at one reference point to that at another, and other means for injecting an incremental voltage into said error signal lead to represent a minor contribution to the desired displacement of said part.

5. A system according to claim 1, wherein said differential switching means comprises a plurality of command input means one for each of said leads, a single feedback means common to said plurality of command input means, and a plurality of output means one for each of said command input means, and means are provided for interpolating among signals derived from said plurality of output means to derive the signal which is applied to said servo motor.

References Cited in the file of this patent
UNITED STATES PATENTS

| | | |
|---|---|---|
| 2,715,703 | Shuck | Aug. 16, 1955 |
| 2,849,668 | Tripp | Aug. 26, 1958 |